United States Patent
Hermann et al.

(10) Patent No.: US 8,618,775 B2
(45) Date of Patent: Dec. 31, 2013

(54) DETECTION OF OVER-CURRENT SHORTS IN A BATTERY PACK USING PATTERN RECOGNITION

(75) Inventors: Weston Arthur Hermann, Palo Alto, CA (US); Scott Ira Kohn, Redwood City, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 7 days.

(21) Appl. No.: 13/343,993

(22) Filed: Jan. 5, 2012

(65) Prior Publication Data

US 2013/0179012 A1    Jul. 11, 2013

(51) Int. Cl.
*H02J 7/00*  (2006.01)
*H02H 3/00*  (2006.01)
*H02H 3/08*  (2006.01)
*H02H 9/08*  (2006.01)

(52) U.S. Cl.
USPC .............. 320/136; 361/86; 361/87; 361/93.1; 361/93.9

(58) Field of Classification Search
USPC .......... 320/136, 152; 307/10.7; 324/429, 433, 324/434; 361/93.8, 86, 87, 93.1, 93.9; 429/90

See application file for complete search history.

(56) References Cited

U.S. PATENT DOCUMENTS 8,334,699 B2 * 12/2012 Asakura et al. ............... 324/426

* cited by examiner

*Primary Examiner* — Richard V Muralidar
(74) *Attorney, Agent, or Firm* — J. Richard Soderberg

(57) ABSTRACT

A controller identifies a condition of a hazardous internal short by comparing patterns of series element voltages to the last known balance condition of the series elements. If the loaded or resting voltage of one or more contiguous series elements uniformly drop from the previously known condition by an amount consistent with an over-current condition, an over-current internal short circuit fault is registered. The desired response is to prevent the affected series elements from heating to a hazardous temperature by summoning the maximum heat rejection capability of the system until the short ceases and the affected elements cool, the cooling function is no longer able to operate due to low voltage, or the affected series string has drained all of its energy through the short. Also includes are responses that allow the battery pack to continue to power the cooling system even though it may enter an over-discharged state.

10 Claims, 7 Drawing Sheets

DETECTION OF OVER-CURRENT SHORTS IN A BATTERY PACK USING PATTERN RECOGNITION

BACKGROUND OF THE INVENTION

The present invention relates generally to detection of and response to potentially hazardous conditions in an electric vehicle battery pack, and more particularly but not exclusively, to detecting and responding to potentially hazardous over-current due to internal short circuit to limit possible excessive thermal conditions of the individual battery cells and modules.

Many high-performance energy storage solutions now employ series-connected modules that, in turn, are series and parallel combinations of individual battery cells. Battery packs used with electric vehicles store large amounts of energy in a small space, producing high energy densities. The battery packs are designed to provide high levels of safety and stability, yet situations can arise where a portion of a battery pack experiences a local thermal condition which generates significant heat. When the temperature is great enough and sustained, the local thermal condition can transform into a runaway thermal condition affecting wide areas of the battery pack, and sometimes the entire battery pack under certain circumstances. This runaway thermal condition can begin when the local thermal condition approaches the runaway thermal point, which can be about 200° C.

Great care and precise attention to detail is used when assembling and testing battery packs. It is sometimes the case that there will be internal shorts in the battery pack, for example between various of the energy storing sub-units themselves or the energy storing sub-units and other structure (housing, chassis, or the like). These internal shorts can develop during operation for any number of reasons. Prior art battery packs contain fusing architectures designed to both actively and passively interrupt external or internal short circuits above normal operating currents. Most short circuit protection devices have a very short thermal time constant and are only effective above a predetermined current. However, an electric vehicle may only be capable of sustaining operation at its maximum current for a short period of time before internal components, including the battery cells, heat to near their temperature limits. Certain classes of internal short circuits may lead to sustained high current situations below the system's maximum operating current (or below the short circuit protection devices' operation point) but at a sufficiently high current such that a sustained internal short may lead to component over-temperature, failure, and a hazard. Fuses with a long thermal time constant intended to protect the battery pack in this region are expensive and heavy and prior art packs have not implemented an inexpensive or effective method for detecting and responding to such an internal short scenario.

What is needed is an apparatus and method for to detecting and responding to potentially hazardous over-current due to internal short circuit to limit possible excessive thermal conditions of the individual battery cells and modules.

BRIEF SUMMARY OF THE INVENTION

Disclosed is an apparatus and method providing to detecting and responding to potentially hazardous over-current due to internal short circuit to limit possible excessive thermal conditions of the individual battery cells and modules. The present invention includes embodiments directed towards detection and apparatus for promoting the use of voltage and current data for the purpose of detecting potentially hazardous over-current due to internal short circuit. Additionally, the present invention includes response processes and structures to address potentially hazardous over-current due to internal short circuit to limit possible excessive thermal conditions of the individual battery cells and modules. The detection is independent of the response in that the specifics of the disclosed detection are not required for the disclosed response, and similarly, the specifics of the disclosed response are not dependent upon the detection described herein. The disclosed response may be initiated by any detection system and the disclosed detection may trigger any suitable response, which in some cases may be to do nothing other than continue monitoring.

Regarding detection, a system and method are disclosed. A detection system for an over-current internal short in a battery pack includes a plurality of electrically-serially-coupled battery elements storing energy for the battery pack; a sensor system configured to collect a plurality of data from the battery elements; and a controller, coupled to the sensor system, configured to evaluate the plurality of data against one or more predetermined patterns associated with a possible over-current internal short, with the controller configured to indicate the over-current internal short when the plurality of data has a predetermined relationship to the one or more predetermined patterns.

A method for detecting an over-current internal short in a battery pack includes a) collecting a plurality of data from a sensor system measuring data from a plurality of electrically-serially-coupled battery elements storing energy for the battery pack and a coolant distribution system disposed among, and electrically isolated from, the plurality of battery elements; b) evaluating, using a controller, the plurality of data against one or more predetermined patterns associated with a possible over-current internal short, with the controller configured to indicate the over-current internal short when the plurality of data has a predetermined relationship to the one or more predetermined patterns.

Regarding responding to a detected non-fusing over-current internal short in a battery pack, a system and method are disclosed. A microprocessor-implemented response system for an over-current internal short in an battery pack includes an evaluator monitoring an over-current internal short flag indicative of a possible over-current internal short within a plurality of electrically-serially-coupled battery elements storing energy for the battery pack; and a remediation system, coupled to the battery elements and responsive to the possible over-current internal short flag when the evaluator detects a likelihood of the possible over-current internal short, to decrease risks associated with the possible over-current internal short when operated.

A computer-implemented method for responding to an over-current internal short in an battery pack includes a) monitoring, using a microprocessor, an over-current internal short flag indicative of a possible over-current internal short within a plurality of electrically-coupled battery elements storing energy for the battery pack; and thereafter b) activating a remediation system coupled to the plurality of battery elements, with the remediation system responsive to the possible over-current internal short flag when the evaluator detects a likelihood of the possible over-current internal short, the activation of the remediation system decreasing risks associated with the possible over-current internal short when operated.

Disclosed are systems and methods for detecting and responding to a single or multiple series element pack internal short circuit of moderate impedance that leads to a sustained over-current. A controller identifies a condition of a hazardous internal short by comparing patterns of series element voltages to the last known balance condition of the series elements. If the loaded or resting voltage of one or more contiguous series elements, however fewer than every element, uniformly drop from the previously known condition by an amount consistent with an over-current condition, an over-current internal short circuit fault is registered. The desired response is to prevent the affected series elements from heating to a hazardous temperature by summoning the maximum heat rejection capability of the system until the short ceases and the affected elements cool, the cooling function is no longer able to operate due to low voltage, or the affected series string has drained all of its energy through the short. Also disclosed are response systems that allow the battery pack to continue to power the cooling system even though it may enter an over-discharged state.

The detection method could also be based on estimating the current using the voltages and other information such as SOC and temperature and cell age. A variation would be to estimate only the difference in current (expected to be zero) and then add the measured system current (which can't be guaranteed to measure the internal short current) to arrive at the total current.

The system responses could also include introducing a secondary short which would source sufficient current to activate the fusing system and stop the current flow in the internal short that itself wasn't sourcing sufficient current, or simply trigger an active fuse or other interrupting mechanism in series with the shorting element(s).

Features/benefits include an ability to detect and respond to potentially hazardous over-current due to internal short circuit to limit possible excessive thermal conditions of the individual battery cells and modules, such as the type used in electric vehicles and similar applications.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Embodiments of the present invention provide an apparatus and method providing to detecting and responding to potentially hazardous over-current due to internal short circuit to limit possible excessive thermal conditions of the individual battery cells and modules. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
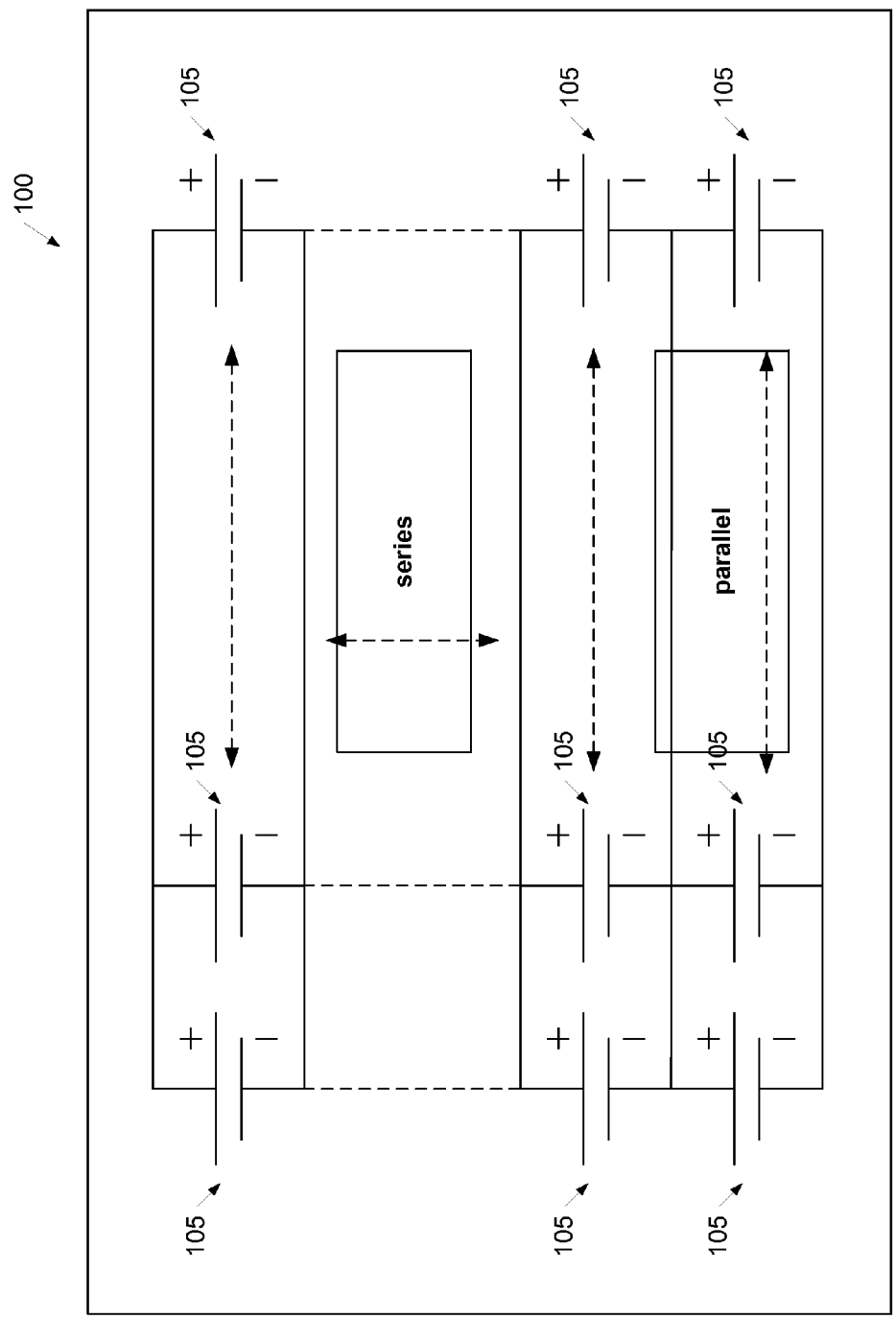
FIG. 1 illustrates an exemplary battery module having a collection of parallel and series connected battery cells.

FIG. 1 illustrates an exemplary battery module 100 having a collection of parallel and/or series connected battery cells 105. Battery module 100 design may include a few to 100's of battery cells 105, electrically communicated in parallel and/or series groupings, from multiple strings of cells in series tied in parallel at "ends" of such strings, to series groupings of parallel/serial combinations, or other permutations. Specifics of the installation of battery module 100 and the nature and type of battery cells 105 will influence how many battery cells 105 are grouped in parallel and series. In the preferred embodiment, lithium-ion is used as the battery cell chemistry, the present invention is applicable to other cell chemistries as well.

Figure 2:
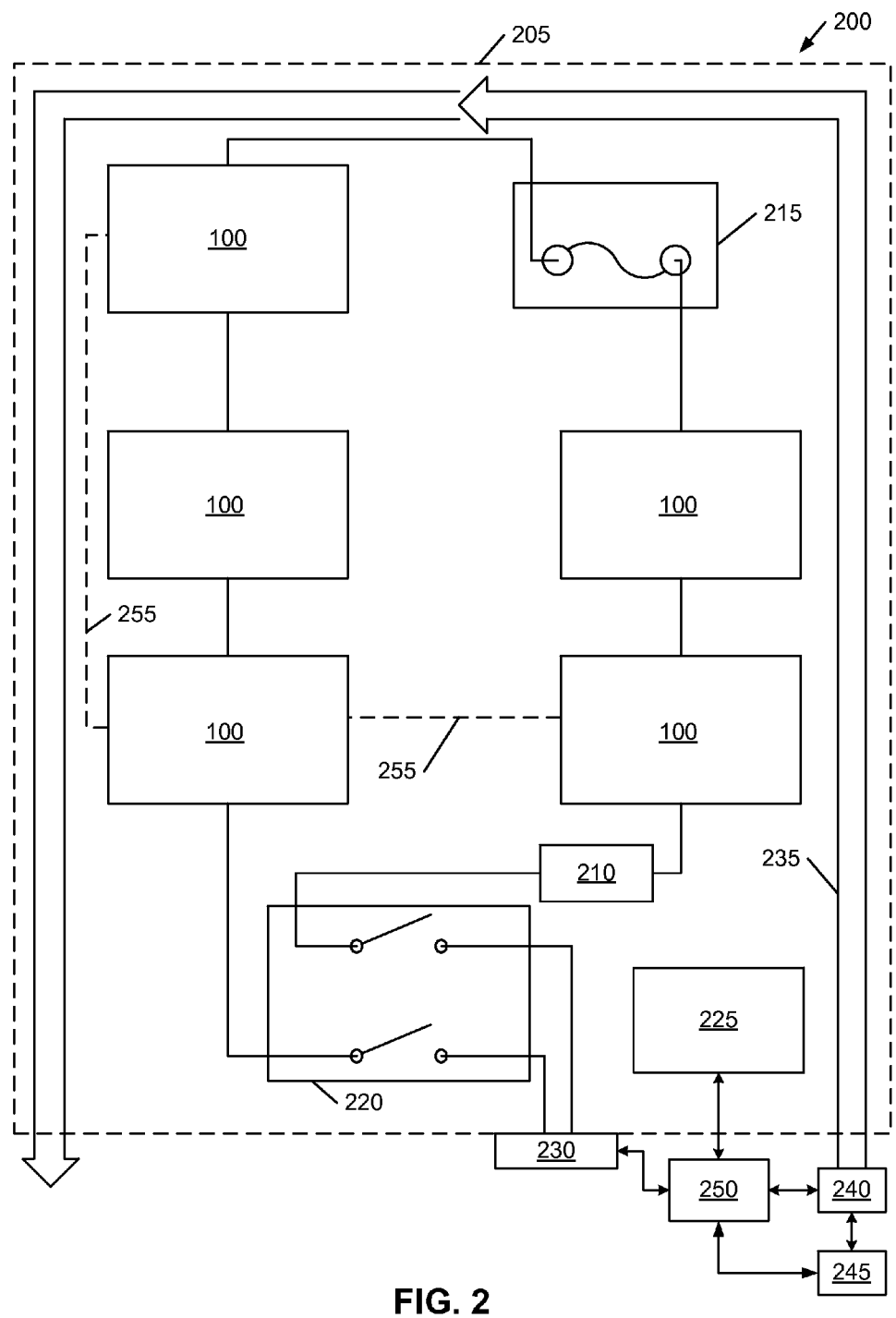
FIG. 2 illustrates a battery pack including a high voltage battery enclosure containing a plurality of battery modules.

FIG. 2 illustrates a battery pack 200 including a high voltage battery enclosure 205 containing a plurality of electrically-serially-coupled battery modules 100 (shown in FIG. 1). Battery pack 200 further includes a current sensor 210, a fuse 215, a set of contactors 220, a battery management system (BMS) 225, and a power connector 230. Enclosure 205 typically provides a structural container (sometimes hermetically closed or semi-sealed) for battery pack 200 components. Battery pack 200 often includes a coolant distribution system (generically represented by coolant loop 235 and pump 240) isolated and insulated from the battery pack 200 components and configured to control their temperature. As will be further described herein, pump 240 (or other coolant controller) is preferably powered by energy from an auxiliary energy storage system 245 (typically a 12V battery) different from battery pack 200. Interrupting available energy from battery pack 200 would interrupt coolant flowing in coolant loop 235 without use of auxiliary energy storage system 245. For ease in explanation, a discrete controller 250 is also shown for interfacing with BMS 225, pump 240, and secondary energy storage system 245 to control the detection and response modalities of the preferred embodiments. Controller 250 may be integrated into other control functions in some embodiments.

Battery pack 200 may include any number of modules 100 different from the five shown in FIG. 2. Modules 100 are serially-coupled inside enclosure 205 with a series path shown in solid lines. In series with serially-coupled modules 100 is current sensor 210, fuse 215, and contactors 220. Current sensor 210 measures series current in battery pack 200. When battery pack 200 is working properly, all modules 100 exhibit the same current and current sensor 210 indicates this value. Fuse 215 is disposed in this series path and is designed to protect against over current, but as noted herein, fuse 215 is not always able to protect long term operation near the design limit, and there are other short circuit loops that do not necessarily include fuse 215.

Contactors 220 are switching systems for selectively communicating modules 100 to an external load through power connector 230. BMS 225 controls contactors 220 and includes controllers and sensors for measuring and determining desired parameters (e.g., operating and SOC characteristics and the like) of battery pack 200.

While great care is used in designing, manufacturing, and testing battery pack 200, sometimes it is the case that an internal short 255 may develop among one or more of the series elements. Representative internal shorts 255 are shown in dashed lines in FIG. 2, but it is understood that internal shorts may develop elsewhere, including internal shorts contained within a series stackup of module 100. One or more of the implicated series elements sourcing current through internal short 255 contribute current through the intended series path as well as through internal short 255. These series elements can thus begin to exhibit sustained high levels of current that may lead to component over-temperature, failure, and sometimes a hazard. This is sometimes further complicated as the object(s) which formed all or part of the short circuit may also create dangerous heat/temperatures. Current sensor 210 is unable to detect/measure any currents sourced through internal shorts 255, and fuse 215 may be unable to protect against sustained currents through internal shorts 255.

Internal short 255 may occur between adjacent HV chain components at different potentials or through the conductive, isolated enclosure in the case that isolation is lost at two or more points, or through another medium, such as a conductive fluid such as salt water, water, water/glycol mixtures, and the like. An impedance of internal short 255 and a number of series elements affected by internal short 255 determines the short current. In some cases internal short 255 may be intermittent. Internal short 255 will have a heat capacity that also helps determine whether internal short 255 will change its impedance (for example, become open circuit) as internal short 255 dissipates power.

Figure 3:
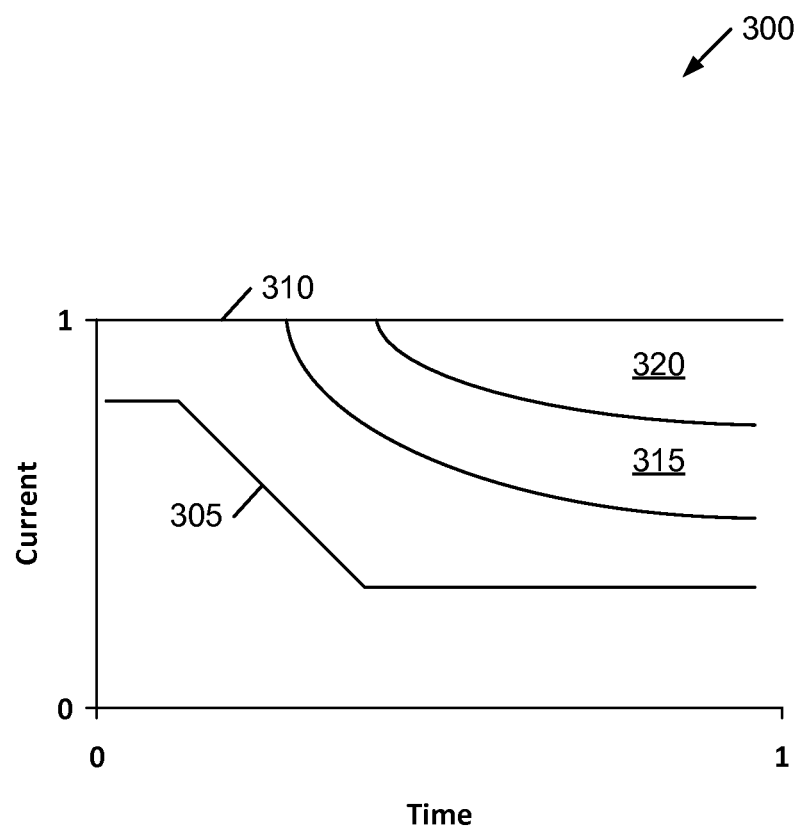
FIG. 3 illustrates operating current, fusing limit, and an affect of cooling on heating-related hazards.

FIG. 3 illustrates a chart 300 depicting operating current, fusing limit, and an affect of cooling on heating-related hazards with respect to time. Chart 300 includes a current limit 305 and a fusing limit 310 as well as a pair of potential hazard regions: a no-cooling overheating region 315 and a cooling overheating region 320. Current limit 305 is a representative curve illustrating generally an operational current limit for battery pack 200. Fusing limit 310 illustrates generally a trigger point for fuse 215 which interrupts series current flowing through modules 100 as measured by current sensor 210. No-cooling overheating region 315 illustrates an area where sustained currents above current limit 305 but less than fuse limit 310 can lead to potentially hazardous overheating in the absence of cooling (for example when pump 240 shown in FIG. 2 is disabled). Cooling overheating region 320 illustrates an area where sustained currents above current limit 305 but less than fuse limit 310 can lead to potentially hazardous overheating with cooling (e.g., with pump 240 active).

In some designs, modules 100 include internal fusible components. The potential hazard regions represent possible current levels for internal short 255 that may be present in a band below the fusing current of any such fusible components and above a current required to cause hazardous overheating of components including battery cells. This range may be from approximately a 2 C discharge to an 8 C discharge in some high energy battery packs for electric vehicles. The range may be higher, such as 10 C to 30 C for higher power battery packs used in plug-in hybrid electric vehicles. Fusible components often have short thermal time constants. Long time constant fusing devices require large thermal mass and are heavy and expensive and are thus undesirable in electric vehicles and the like.

While a hazardous heating condition may be detected through temperature sensing, it is not the case that every series element is guaranteed to have a temperature sensor. While many battery packs have a voltage sense on each series element, temperature sensors are used less frequently, such as they may be used one temperature sensor for every 5 or 10 or 15 series elements. Furthermore, even when a temperature sensor is present in the affected series string, any changes to voltage values due to internal short 255 change instantaneously while the temperature rise caused by internal short 255 may take time to climb to a value outside of the operating region. (It is important to consider that sometimes the determined (e.g., measured) voltages will be well within normal range but still indicate that there is an internal short.) When internal short 255 has a current profile that will fall into region 315 or region 320, quick detection and response are important.

Unless there is a problem, series elements do not often go out of balance quickly in battery packs. For a healthy battery pack, relative voltages of the series elements over most of the SOC window changes very slowly over many weeks, months, or years. Active systems are in place in many battery packs to balance the resting voltages of the series elements through current bleeding or current shuttling.

As seen in FIG. 2, some battery packs 200 have a cooling system allowing rejection of heat from inside enclosure 205. It is common in electric vehicles and other electric-powered systems to have an auxiliary power source (e.g., a 12V battery, combustion engine, fuel cell or the like) in addition to the main storage system (in an electric vehicle this is often referred to as a traction battery as it provides drive energy among other uses). Some cooling systems are powered from the 12V battery and some are powered by the traction battery. In some implementations, the cooling system may be less effective in some operational modes, for example when the vehicle is stationary.

Some battery packs contain cells with cell-level over temperature protection devices such as PTCs and CIDs. However, these devices have a voltage rating that, when exceeded, can allow the short circuit to arc across the device and possibly lead to a fire. Many protection devices have a voltage rating of approximately 20V. Lithium ion batteries containing such elements (a common voltage is ~4V per element) experiencing internal shorts across 5 or more series elements are therefore not protected by such cell-level protection devices. Furthermore, in the event that enough elements are heated in one thermal mass, the protection devices may not stop the current until the cells have become hot enough for the thermal core of the thermal mass to continue self-heating which can in some situations create a fire.

When internal short 255 is present, the voltage of the affected series elements will be a loaded voltage that may be distinguishable from unaffected series elements. For the over-current range of concern, this loaded voltage may be approximately 300 mV to 1V lower than the unaffected series elements for high energy packs used in electric vehicles. Voltage sensing is usually accurate to within several mV, thus sufficient to measure anomalous voltages of the expected range.

Many signals are present in the battery pack that may assist in detecting an over-current due to internal short 255. These include series element voltage, cell and busbar temperature measurements, current sensors, total series chain voltage, module voltage, cable or conductor voltage drop (voltage difference from one connection point to another).

Figure 4:
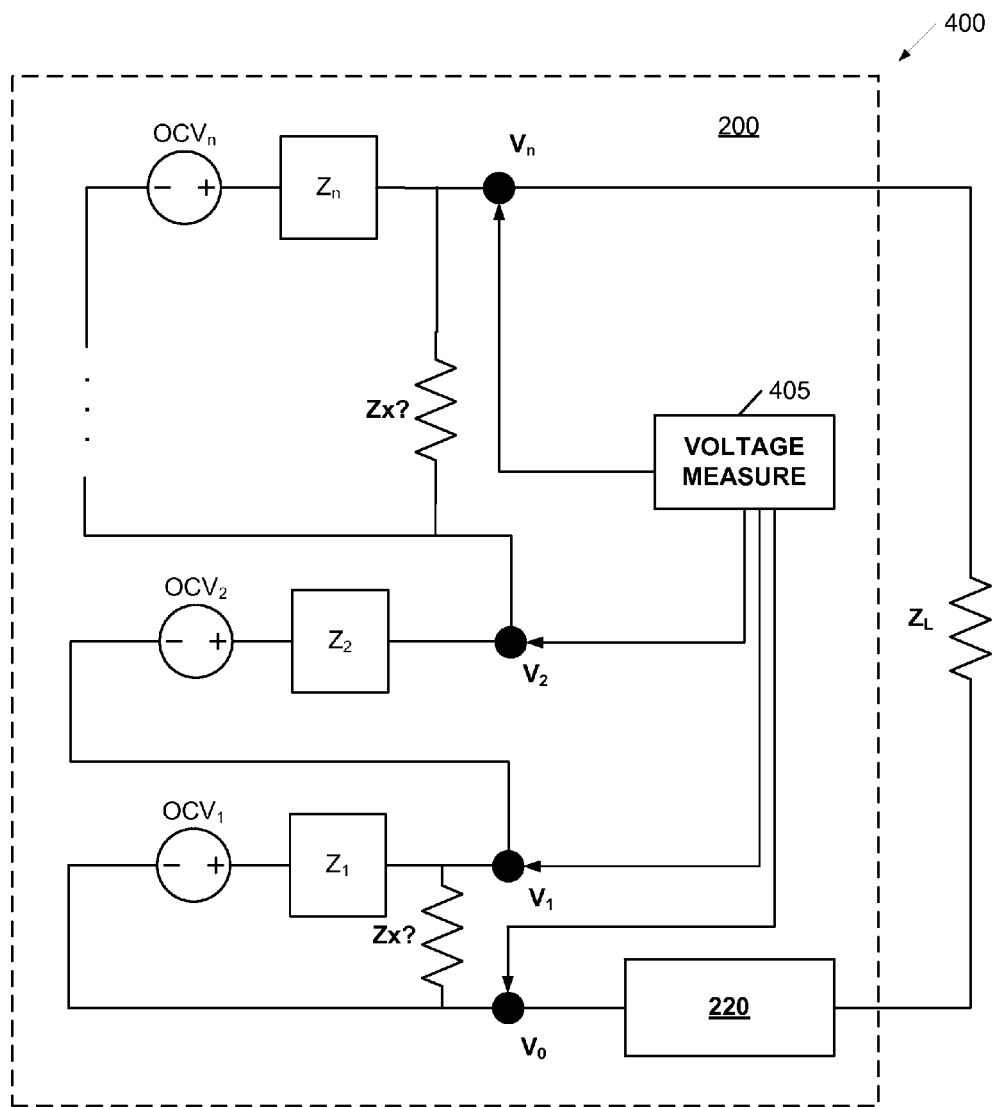
FIG. 4 illustrates a representative equivalent circuit diagram for the battery pack shown in FIG. 2.

FIG. 4 illustrates a representative equivalent circuit model 400 for battery pack 200 shown in FIG. 2. Circuit model 400 represents the series elements of battery pack 200 as open-circuit voltage sources ($OCV_i$) with a series impedance ($Z_i$). A monitoring circuit 405 measures $V_0, V_1, V_2 \ldots V_n$. In the preferred embodiment, monitoring circuit 405 is part of BMS 225. One or more possible internal shorts are shown as an impedance ($Z_S$) between series elements. A load outside battery pack 200 is shown as $Z_L$. In some implementations, circuit model 400 may include current sensor 210 located "outside" of battery pack 200, or as noted elsewhere, there are one or more additional current sensors 210, some of which may be located outside.

Battery systems typically achieve similar OCV values for all series elements and have similar series impedance values and behavior for all series elements. As a result, a simple though perhaps least sensitive (with acceptable false positive rates) would be a detection of the voltage difference from one series element to another. For each measured series element voltage (e.g. $V_1-V_0, V_2-V_1, \ldots V_n-V_{n-1}$), controller 250 analyzes these voltages to check for a single or set of outliers with a certain magnitude as illustrated in FIG. 5 and described herein.

At a high level of generalization, the detection system and method detects a series element which is sourcing more current than the expected current which indicates that there is an internal short. Typically, all series elements source the same current by definition and this is measured via a current sensor. In the case of an internal short, one or more series elements is sourcing a measurable amount of intended current AND an unmeasured and unintended current through the internal short. The magnitude of the total sourced current is desirable though this could be simplified to the magnitude of the internal short since none is expected and only a certain amount is allowable when you assume that the system is operating at its maximum.

Some battery packs do not measure each series element but a similar method could still be used. The sensitivity of the detection method may be worse, but measuring each series element is not required for the present invention.

Figure 5:
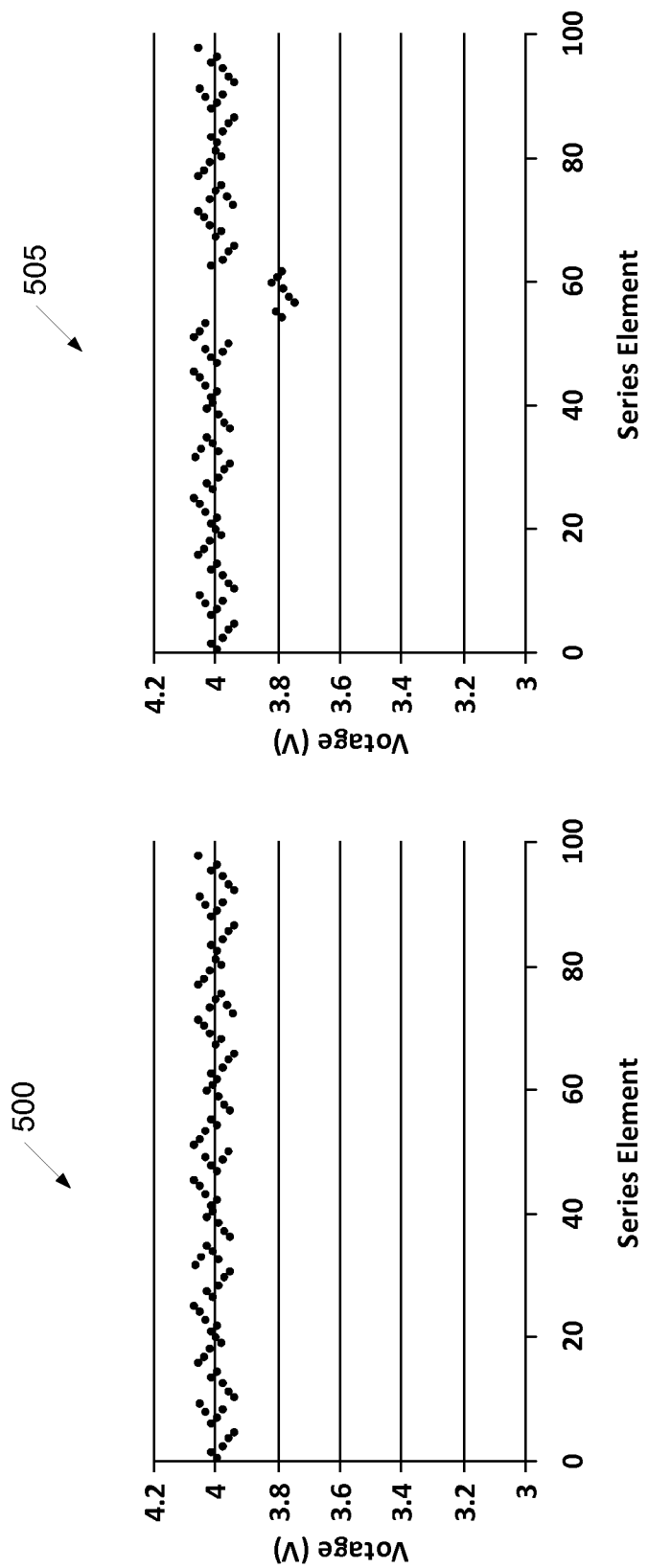
FIG. 5 illustrates a pair of charts identifying a reference voltage distribution and a representative voltage distribution with over-current internal short involving 8 series elements.

FIG. 5 illustrates a pair of charts identifying a reference voltage distribution chart 500 and a representative voltage distribution chart 505 with over-current internal short involving 8 series elements.

Detection

Chart 500 is the reference pattern and represents a healthy battery pack 200. There are many different parameters and patterns that may be used, such as the series voltages of the preferred embodiment shown in chart 500 and chart 505. For each series element (this example uses $V_N$, N=1-100) a reference voltage is compared against a corresponding series voltage (such as a real-time voltage measurement during operation). Chart 505 clearly shows an internal short involving 8 series elements (N=53-60).

Controller 250 compares the relative values of series element voltages from chart 505 with a reference set of recent relative voltage values from chart 500 looking for an offset in one or more HV chain contiguous series elements. Controller 250 may statically compare to this reference value or a preset general reference value and/or monitor for a step change in relative voltages consistent with an internal short forming. Controller 250 may run a comparison more frequently in certain modes, such as during drive mode and less frequently in other modes, such as off or idle.

Because series element imbalance does not change quickly, the reference set of chart 500 may have been recorded days or weeks earlier during a charge, rest, or other time when the voltage values have been stable. This reference set may also be a preset value beyond the range of voltage variation during normal operation when balancing is active, for example 50 mV.

A predetermined range of relative voltages (either relative to reference or an absolute preset range) dependent on SOC and temperature (for example, 300 mV to 1000 mV) may be used to identify internal shorts within the over-current region and distinguish the reading from normal behavior. This range may become larger for lower SOC and/or lower temperatures due to higher impedance and/or the shape of the open circuit voltage curve.

Controller 250 of the preferred embodiment handles false positives (a voltage difference not due to an internal short). The impact of false positives on a user and the system depends on the nature and degree of response, but a response that changes cooling system behavior may not significantly inconvenience the user. The magnitude of internal short current required to produce an over-current situation is large enough that a detectable signal is nearly always present. Large operational currents, large impedance variations within the pack, and low state of charge all may contribute to series element imbalance that may be interpreted as an over-current internal short by controller 250. For this reason, controller 250 may ignore positive indications of an over-current internal short under some operational conditions.

The use of a "last-known" voltage imbalance reference for comparison helps distinguish between a recently formed internal short and slow causes of imbalance that do not present an immediate hazard.

While less effective than voltage pattern monitoring, a pattern of series element temperatures consistent with overheating of a contiguous string of series elements is also disclosed to assist in diagnosis. Conductor temperatures also could indicate current levels different than pack current as determined by a pack current sensor.

When relative voltages consistent with a one or more contiguous series elements being loaded is still present when the contactors are open (low or zero pack current), further evidence is gathered for a diagnosis. Controller 250 may also monitor the relative voltage change of the series element voltages (dV/dt) to assess if current is flowing through the various series elements at different rates.

Some battery management systems may be able to estimate brick current from the voltage trace. In this case, the detection threshold may be in units of amps. Or the estimate could be based on the brick current difference based on the difference in measured voltage and the estimated impedances. A step change in pack voltage may signal an onset of loaded voltages from a string of shorted series elements. In some instances, this could be similar for module voltage. Voltages between connection points of conductors could show a voltage drop due to an unexpected current. Current sensors employed throughout the pack could report current values that are compared to the others to look for an internal short.

Response

Once an internal short has formed, the heat generated is desirably removed from the affected series elements until one of the following conditions: i) the short ceases and the affected elements cool, ii) the cooling function is no longer able to operate due to low battery pack voltage, iii) the affected series string and/or surrounding cells are below an SOC where further heating is hazardous, or iv) the affected series string has drained all of its energy through the short. Controller 250 may request maximum cooling possibly including liquid circulation and operation of a refrigerant compressor and/or refrigerant condenser and/or coolant radiator.

Some battery packs may protect itself from over-discharge by stopping power to a cooling system when one or more series element voltages fall below a preset level (for example, 3.0V). In some embodiments, controller 250 allows the affected elements to continue discharging with loaded voltages below this preset level to continue to provide power to the cooling system. Controller 250 thus overrides this low-voltage protection system when the internal short has been detected.

In some cases, such as when the vehicle is moving, controller 250 may instruct the battery pack to stop providing power to the vehicle, or preferably, initiate a sequence of slowly bringing the vehicle to a stop or gradually reducing the power limits sent by the battery pack to the other systems in the vehicle. Preferably controller 250 provides notification to the user, but such notifications are secondary to rapidly responding to the over-current internal short.

Since controller 250 detects which series elements are affected by the internal short, controller 250 also knows whether a fast, high voltage rated fuse or similar current interrupt devices are part of the internal short circuit. Many packs have a fuse near the midpoint of the series chain or in other locations. When such a fuse is present between the affected series elements, under some circumstances controller 250 intentionally spikes the current in those elements and blows that fuse, interrupting the short. One way that this is accomplished is by using a switching inverter and commanding solid state switches that are part of the inverter to short the battery pack. Another device, such as for example, a solid state "crowbar" switch across the pack terminals, may be activated to blow the fuse and interrupt the short when the internal short would be interrupted by opening the particular fuse. There could also be an active device such as a contactor or relay, chemical fuse, or pyrotechnic disconnect.

In general, detection of a non-fusing over-current short circuit includes proper selection, placement, and implementation of the one or more sensors of a sensor system. Controller 250 monitors the sensor system and applies the proper detection logic based upon the detection mechanism. Upon detection of actual or possible non-fusing over-current short circuit, controller 250 initiates operation of a responses system to respond appropriately to the detected actual or possible non-fusing over-current short circuit. These are two independent, though related, aspects of the present invention. The first is detection of a non-fusing over-current short circuit event and the second is response to such an event. The response options, including those available beyond those shown and described herein, do not require detection of the non-fusing over-current short circuit using one of the disclosed systems or processes. Similarly, detection options, including those available beyond those shown and described herein, do not require response of the non-fusing over-current short circuit using one of the disclosed systems or processes.

Figure 7:
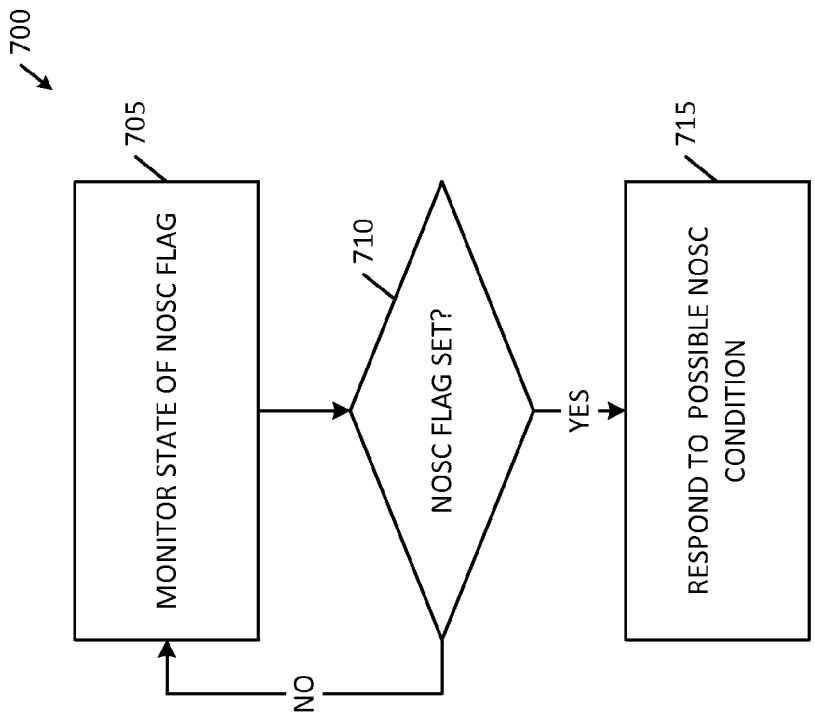
FIG. 7 illustrates a flow diagram for a response process.
Figure 6:
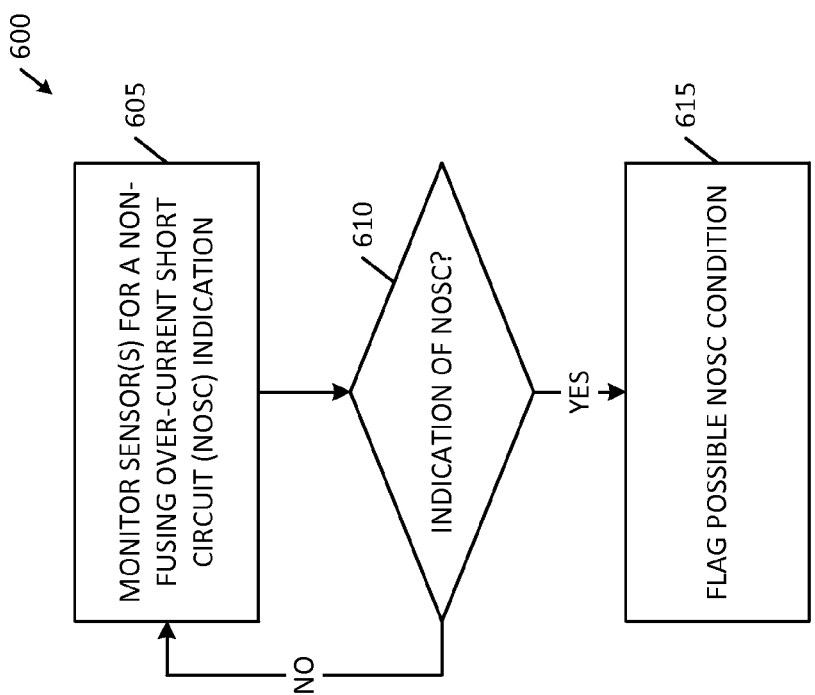
FIG. 6 illustrates a flow diagram for a detection process.

FIG. 6 and FIG. 7 further illustrate this independence and relationship. FIG. 6 illustrates a flow diagram for a detection process 600. Process 600 includes a non-fusing over-current short circuit (NOSC) monitoring step 605, an NOSC test step 610, and a NOSC flag step 615 when the test at step 610 is true. While the preferred embodiment is described in a context for a non-fusing over-current short circuit, it is understood that the short has to last long enough for sensors to measure a difference (e.g., a voltage difference) but a fusing/interrupting event could be relatively long as compared to the measuring timing.

Step 605 monitors one or more sensors of the sensor system. The sensors are implemented to examine specific conditions, parameters, and operational characteristics of battery pack 200 appropriate for the methodology used to detect a non-fusing over-current short circuit inside a battery enclosure. An result of monitoring data from the sensors is tested at step 610 to determine whether a NOSC is present. In some cases it may be an indication of a likely NOSC or a possible NOSC.

Depending upon the nature of the test and the threshold set for initiation of remediation, there may be different responses and urgency levels for initiation of the response. In some implementations, there are combinations of sensors providing different indications, not all of which may have the same urgency. There may also be different responses appropriate for different types of sensor indications. Thus the test at step 610 may be binary type indication (e.g., YES or NO as shown), or it may indicate varying probabilities for different possible risks.

When the test at step 610 is positive to indicate existence, or possible existence, of a NOSC in battery pack 200, process 600 sets a flagging mechanism or other status mechanism appropriate for the test performed at step 610. Some other system or process may monitor the flag and initiate an appropriate response. Flagging a possible NOSC condition within the enclosure 205 identified in step 615 refers to those general concepts of acknowledging and initiating further action. This is not limited to polling/testing a state of a data flag, but may include interrupt processing and other evaluative systems for responding to a state, variable, signal, or other "flag" that indicates an affirmative test/evaluation at step 610. The results of step 615 are made available to a response initiation process, such as the process shown in FIG. 7.

FIG. 7 illustrates a flow diagram for a response process 700. Process 700 includes a monitoring step 705, a test step 710, and a response initiation step 715. Step 705 includes an appropriate evaluative process for monitoring a status of a NOSC flag, such as may have happened at step 615 of FIG. 6. Step 710 tests whether the NOSC flag or data meets a predetermined pattern indicating that a NOSC is, or may be, present. The pattern may be a bit value, a threshold, or other parameter that can be used to selectively test for the NOSC condition.

When the test at step 710 is affirmative that a NOSC is, or may be, present, process 700 executes step 715 to initiate response to the detected NOSC condition. The initiation response varies but is appropriate for the detected condition and other implementation details. Further details of the sensor(s) and possible response(s) are detailed herein. As noted herein, some implementations may use one or more of the sensors disclosed herein. Some of the implementations detect a NOSC with a high probability of accuracy while others detect possible a possible NOSC. Proper selection and use of one or more different types of sensors increases the data from which highly accurate predictions are made or are eliminated as a possibility.

In the discussion of preferred embodiments, reference is sometimes made to a predetermined pattern. This is not to be taken to mean that the systems and processes of the present invention are not applicable to adaptive systems. It is the case that the predetermined pattern, as that term is used herein, includes the criteria by which an adaptive system determines whether a possible short may exist. Additionally, reference is sometimes made to the data "representing" current, and this concept is used expansively to encompass values that have been determined by the system, as well as more theoretical concepts including modeling and prediction. Further, various embodiments are described as determining a value, or a representative value. Determining in this context is used expansively to include direct measurement as well as other modalities for obtaining the referenced information or data.

Figure 8:
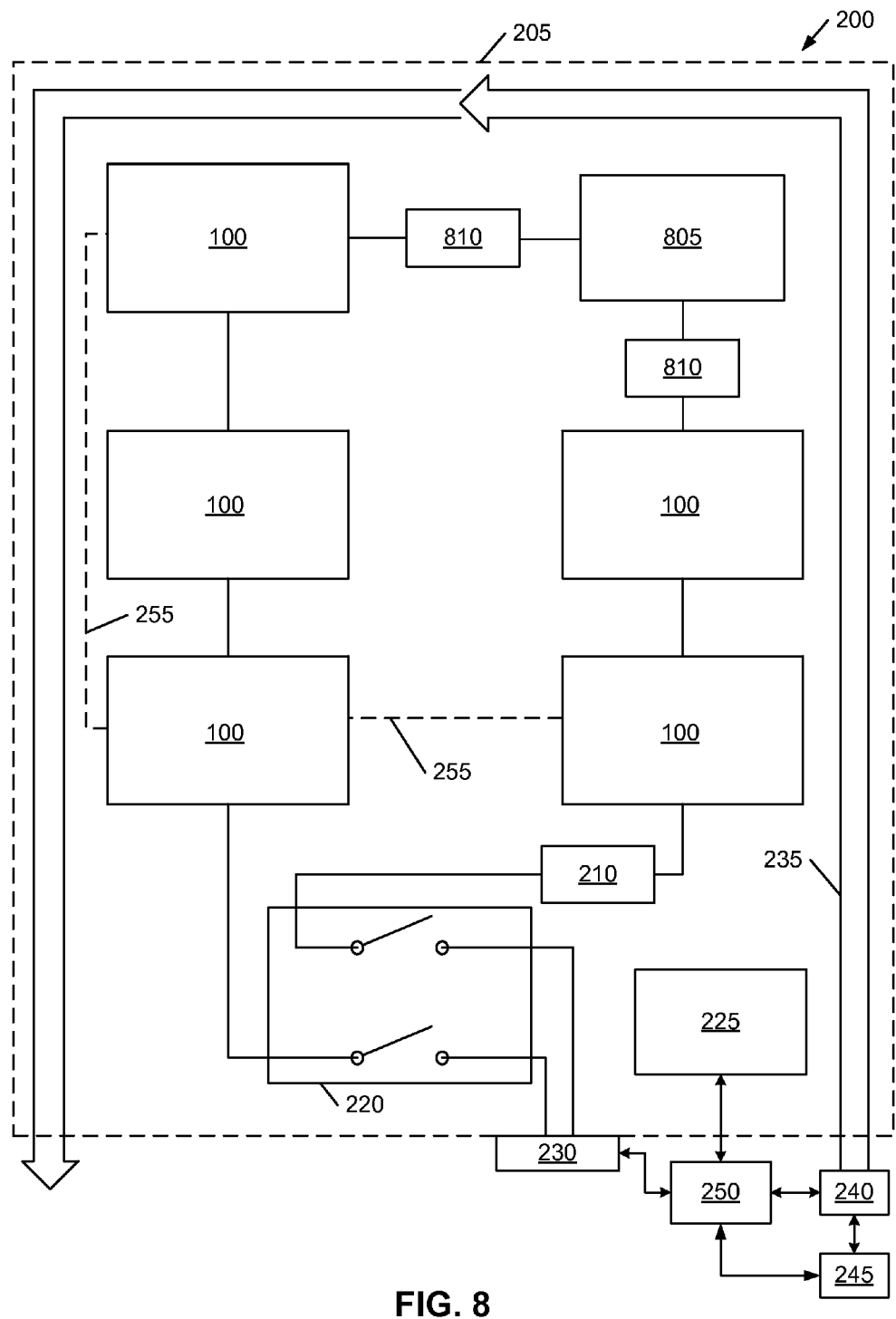
FIG. 8 illustrates a modified battery pack.

FIG. 8 illustrates a modified battery pack 800 including protective features as described herein. Battery pack 800 is similar in construction to battery pack 200 with the replacement of fuse 215 with a current interrupter 805 and one or more series elements 810. Current interrupter 805 preferably includes active features, and in some implementations it may also include passive features, similar to fuse 215 and the like. Current interrupter 805 may include different modes of operation for triggering/interrupting current flow in battery pack 800. These modes may be set by controller 250, or current interrupter may be fully or partially autonomous. Series elements 810 may provide data for operation of current interrupter 805 or may include active element to implement or assist in implementation of operational modes for current interrupter 805 (e.g., may include a sensing feature and/or a current interrupting feature).

Fuse 215, when completely passive and not enhanced by other features of the present invention, typically includes the limitations described herein. Current interrupter 805 in some implementations offers hybrid protection, such as in the following example that includes both an active part and a fuse part. When contactors 220 are open and current interrupter 805 is set to open, or open with very little current, while the passive "fuse" part is closed and only opens, even when almost no current flow is expected, at currents exceeding the maximum continuous rating of battery pack 800. Series elements 810 may include one or more additional current sensors 210, or other monitoring/measuring/control system distributed in one or more additional locations. For example, when series element 810 includes a second current sensor like current sensor 210, controller 250 compares currents and indicates a possible short-circuit when there is a difference.

The systems and methods are preferably implemented using a microprocessor executing program instructions from a memory, the instructions causing the apparatus to perform as described herein. The system and methods above has been described in general terms as an aid to understanding details of preferred embodiments of the present invention. In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A detection system for an over-current internal short in a battery pack, comprising:
    a plurality of electrically-serially-coupled battery elements storing energy for the battery pack;
    a sensor system configured to collect a plurality of data from said battery elements; and
    a controller, coupled to said sensor system, configured to evaluate said plurality of data against one or more predetermined patterns associated with a possible over-current internal short, with said controller configured to indicate said over-current internal short when said plurality of data has a predetermined relationship to said one or more predetermined patterns.

2. The detection system of claim 1 wherein said plurality of data represent current sourced by each element of a set of said plurality of electrically-serially-coupled battery elements and said one or more predetermined patterns include a set of parameters representing an expected current sourcing profile for said set of electrically-serially-coupled battery elements.

3. The detection system of claim 2 wherein said sensor system determines a voltage for each battery element of said set of battery elements and wherein said plurality of data include a reference set of series element voltage measurements of said set of battery elements.

4. The detection system of claim 2 wherein said sensor system determines a temperature for each battery element of said set of battery elements and a busbar of said battery pack and wherein said plurality of data include a reference set of series element temperature measurements of said set of battery elements.

5. The detection system of claim 2 wherein said sensor system determines a current for each battery element of said set of battery elements and wherein said plurality of data include a reference set of series element current measurements of said set of battery elements.

6. A method for detecting an over-current internal short in a battery pack, the method comprising the steps of:
  a) collecting a plurality of data from a sensor system measuring data from a plurality of electrically-serially-coupled battery elements storing energy for the battery pack and a coolant distribution system disposed among, and electrically isolated from, said plurality of battery elements;
  b) evaluating, using a controller, said plurality of data against one or more predetermined patterns associated with a possible over-current internal short, with said controller configured to indicate said over-current internal short when said plurality of data has a predetermined relationship to said one or more predetermined patterns.

7. The detecting method of claim 6 wherein said plurality of data represent current sourced by each element of a set of said plurality of electrically-serially-coupled battery elements and said one or more predetermined patterns include a set of parameters representing an expected current sourcing profile for said set of electrically-serially-coupled battery elements.

8. The detecting method of claim 7 wherein said sensor system determines a voltage for each battery element of said set of battery elements and wherein said plurality of data include a reference set of series element voltage measurements of said set of battery elements.

9. The detecting method of claim 7 wherein said sensor system determines a temperature for each battery element of said set of battery elements and a busbar of said battery pack and wherein said plurality of data include a reference set of series element temperature measurements of said set of battery elements.

10. The detecting method of claim 7 wherein said sensor system determines a current for each battery element of said set of battery elements and wherein said plurality of data include a reference set of series element current measurements of said set of battery elements.

* * * * *